US005848460A

United States Patent [19]

Rasmussen et al.

[11] Patent Number: 5,848,460

[45] Date of Patent: Dec. 15, 1998

[54] BEARING PULLER

[76] Inventors: Neils L. Rasmussen, 1628 S. Main St., Orem, Utah 84058; Kelly J. Rasmussen, 1616 S. 400 West, Provo, Utah 84601

[21] Appl. No.: 838,401

[22] Filed: Apr. 7, 1997

[51] Int. Cl.[6] .......... B23P 19/04

[52] U.S. Cl. .......... 29/263

[58] Field of Search .......... 29/244, 253, 255, 29/256, 258–265, 280, 282; 269/49, 48.2

[56] References Cited

U.S. PATENT DOCUMENTS

| | | | |
|---|---|---|---|
| 1,504,650 | 8/1924 | Smith | 29/280 |
| 1,544,246 | 6/1925 | Leslie | 29/255 |
| 1,754,059 | 4/1930 | Staser | 29/259 |
| 3,275,299 | 9/1966 | Meslew | 254/131 |
| 4,072,335 | 2/1978 | Tift et al. | 254/131 |
| 4,173,813 | 11/1979 | Clayton et al. . | |
| 4,488,713 | 12/1984 | Kosmal et al. | 264/48.2 |
| 4,724,608 | 2/1988 | Parrott | 29/259 |
| 5,226,208 | 7/1993 | Gracey . | |
| 5,333,378 | 8/1994 | Sjobom . | |

FOREIGN PATENT DOCUMENTS

| | | | |
|---|---|---|---|
| 749680 | 5/1943 | Germany | 269/48.2 |

*Primary Examiner*—Robert C. Watson

[57] ABSTRACT

The improved bearing puller is an invention that because of its unique geometry and design, will facilitate the easy and rapid removal of blind press fit bearings with little or no resultant damage to the bearing housing. It is principally intended for use in the extraction of automotive clutch press fit pilot bearings from blind press fit bearing housings.

2 Claims, 2 Drawing Sheets

BEARING PULLER

BACKGROUND OF THE INVENTION

The present invention relates to bearing, wheel, and gear pullers, and more especially to pullers of the type required to extract clutch pilot bearings from blind pilot bearing housings.

From time to time, the extraction of bearings and the like is required for the service of various machines. It is well known in the industry that frequently during the process of extracting a bearing, the respective bearing housing is damaged or destroyed. Furthermore, notwithstanding the damage or potential damage to the mating structure, the bearing extraction process can be difficult and time consuming.

SUMMARY OF THE INVENTION

The present invention relates to an improved bearing puller having a unique eccentric headed bolt and locking wedge such that when the eccentric head of the bolt is lockingly engaged to the bearing by means of the locking wedge and a wedge jam nut, the bearing is readily extractable by applying a load of a sufficient magnitude to the bolt. In a preferred embodiment, the bearing puller is provided with a load sleeve, a load washer, and a load nut. When the load nut is rotated into contact with the load washer, and the load washer is also slidably moved into contact with the load sleeve, the load sleeve comes into contact with the bearing housing, and thus a load is applied to the bearing through the bolt. This load, when of sufficient magnitude and duration, causes the bearing to become extracted.

It is accordingly the object of the present invention to provide a bearing extraction device that allows the user to quickly and easily extract a pressed bearing or the like with little or no damage to the bearing or the bearing retaining structure.

DESCRIPTION OF DRAWINGS

The objects and many attendant advantages of this invention will be readily appreciated and become readily apparent as the same becomes better understood by reference to the following detailed description, when considered in conjunction with the accompanying drawings and in which like reference numerals designate like parts throughout the figures thereof and wherein.

DETAILED DESCRIPTION OF THE PREFERRED EMBODIMENT

In order to facilitate the understanding of the present invention in reviewing the drawings accompanying the specification, a feature list is provide below. It is noted that like features are like numbered throughout all of the figures.

FEATURE TABLE

| Number | Feature |
|---|---|
| 10 | Bearing puller in general |
| 20 | Bolt in general |
| 22 | Bolt eccentric protrusion |
| 24 | Bolt non-eccentric end |
| 30 | Locking wedge in general |
| 32 | Locking wedge block |
| 40 | Wedge jam nut in general |
| 50 | Load sleeve in general |
| 52 | Closed end load sleeve contact surface |
| 54 | Open end load sleeve contact surface |
| 56 | Load sleeve slot |
| 60 | Load washer in general |
| 62 | Thrust washer contact surface |
| 70 | Load nut in general |
| 80 | Bearing in general |
| 82 | Bearing blind surface |
| 84 | Bearing housing in general |
| 86 | Bearing housing hole |
| 88 | Bearing housing contact surface |

Figure 1:
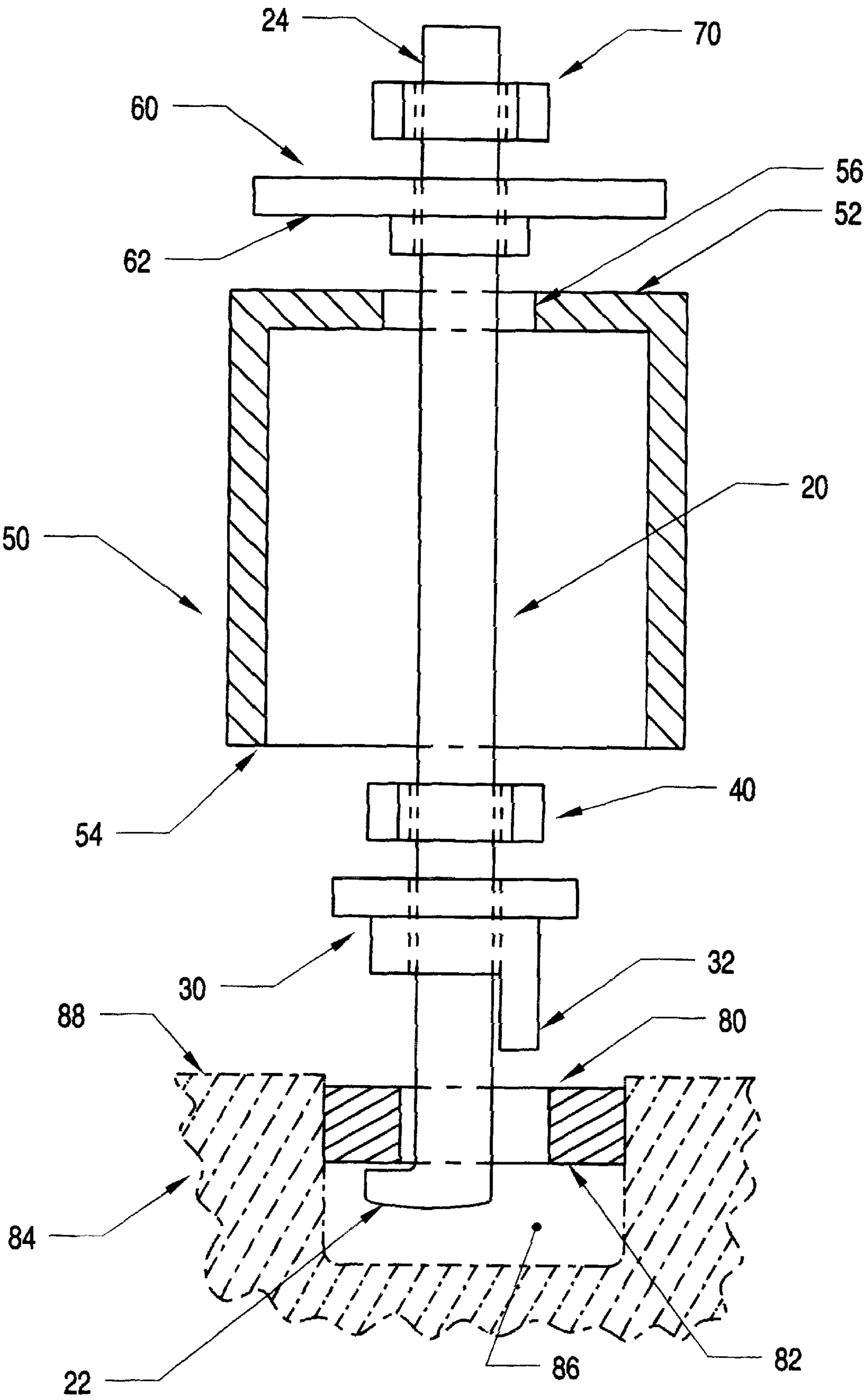
FIG. 1 is an orthographic view of the preferred embodiment of the improved bearing puller. The bearing housing, the bearing, and the load sleeve are depicted with the front half of their respective geometry cut away. The bearing puller is in a disassembled position.

Referring now to the drawings and particularly to FIG. 1, the invention is an improved bearing puller 10 that comprises a bolt 20, a locking wedge 30, a wedge jam nut 40, a load sleeve 50, a load washer 60, and a load nut 70. The bolt includes an eccentric protrusion end 22 and a non-eccentric protrusion end 24. The locking wedge includes a locking wedge block 32. The load sleeve includes a closed end contact surface 52, an open end contact surface 54 and a slot 56.

Figure 2:
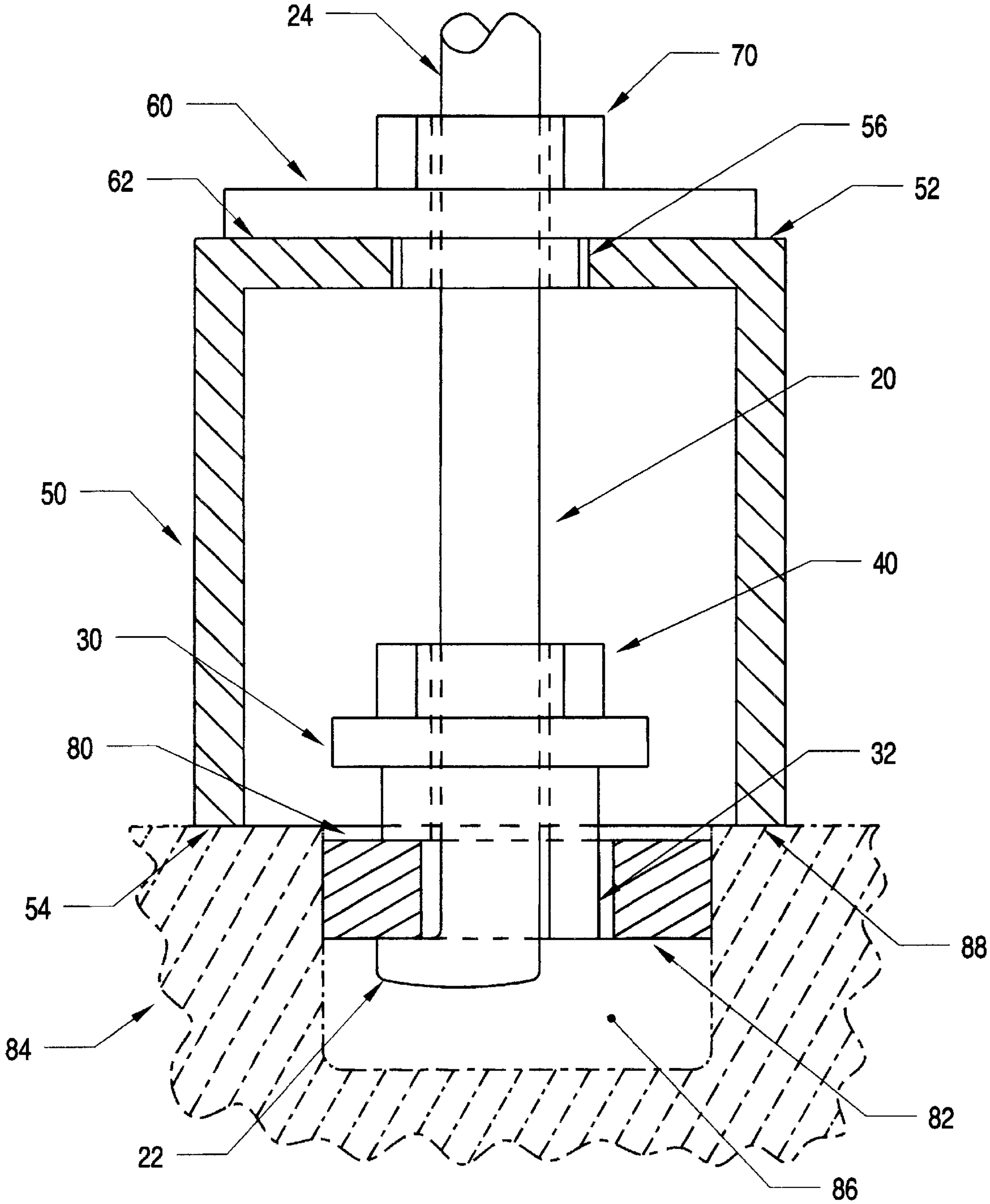
FIG. 2 is an orthographic view of the preferred embodiment of the improved bearing puller. The bearing housing, the bearing, and the load sleeve are depicted with the front half of their respective geometry cut away. The bearing puller is in an engaged position.

The operation of the improved bearing puller can be seen by reference to FIGS. 1 and 2. Bolt 20 is placed in bearing hole 86 with eccentric protrusion 22 in contact with the bearing blind side surface 82 of bearing 80. Block 32 of locking wedge 30 is slid into bearing hole 86 and wedge jam nut 40 is tightened against wedge 30. Load sleeve 50 is placed over bolt 20 with bolt 20 being located in load sleeve slot 56, and load sleeve open end 54 in contact with bearing housing contact surface 88. Load washer 60 is placed over bolt non-eccentric end 24 and placed in sliding contact with load sleeve closed end 52. Load nut 70 is threaded over bolt non-eccentric end 24 and placed in threadingly in contact with load washer 60. When torque is applied to load nut 70, load nut 70 causes a load to be transmitted through load washer 60, load sleeve 50 and into the bearing housing 84. The load is reacted by an equal load that is transmitted through bolt 20, bolt eccentric protrusion 22, and into bearing 80. When a torque of sufficient magnitude and duration is applied to load nut 70, bearing 80 becomes extracted.

While there is shown and described herein certain specific structure embodying the invention, it will be manifest to those skilled in the art that various modifications and rearrangements of the parts may be made without departing from the spirit and scope of the underlying inventive concept. The subject invention is not limited to the particular forms herein shown and described except insofar as indicated by the scope of the appended claims.

I claim:

1. An improved object puller wherein said object puller comprises a bolt, a wedge, and a wedge jam nut, said bolt having a first end and a second end and wherein said first end defines an eccentric protrusion, and wherein the cross-sectional shape of said bolt defines a substantially non-semicircular cross-sectional shape, said wedge defining a hollow cylinder having a first end and a second end and wherein said first end includes a first portion and a second portion, and wherein said first portion is of a greater length than said second portion, and said wedge jam nut defines a threaded nut, said wedge being externally slidingly engagable to said bolt, said wedge jam nut being threadingly engagable to said bolt and said wedge being lockingly engagable to said bolt such that when said eccentric bolt protrusion is engaged to a retained object and said wedge jam nut is lockingly engaged to said bolt and said retained object and a predetermined load is applied to said bolt, said retained object is extracted and wherein said object puller includes a load sleeve, a load washer, and a load nut, said load sleeve and said load washer being slidingly engagable to said bolt, said load nut being threadingly engagable to said bolt, said load sleeve, load washer, and load nut providing a load reaction path such that when a predetermined torque is applied to said load nut, said bolt is threadingly movable against a retained object such that said retained object is extracted.

2. The object puller of claim 2 wherein said load sleeve is slidingly impactable against said load washer and said load nut such that when a predetermined impact load is applied to the load sleeve, the load is transmitted through the bolt and to a retained object causing the retained object to become extracted.

* * * * *